(12) United States Patent
Sivakumar et al.

(10) Patent No.: US 8,542,618 B2
(45) Date of Patent: Sep. 24, 2013

(54) SYSTEMS AND METHODS OF IMPROVING PROTOCOL PERFORMANCE

(75) Inventors: Raghupathy Sivakumar, Alpharetta, GA (US); Yeonsik Jeong, Dunwoody, GA (US); Sandeep Kakumanu, Atlanta, GA (US); Cheng-Lin Tsao, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1340 days.

(21) Appl. No.: 11/939,930

(22) Filed: Nov. 14, 2007

(65) Prior Publication Data
US 2008/0112345 A1   May 15, 2008

Related U.S. Application Data

(60) Provisional application No. 60/858,989, filed on Nov. 14, 2006.

(51) Int. Cl.
*H04B 7/00*   (2006.01)

(52) U.S. Cl.
USPC .......................... 370/310; 370/313; 370/315

(58) Field of Classification Search
USPC ............... 370/232, 235, 229, 328, 335, 225, 370/310, 395.52, 468, 465, 410, 401, 400
See application file for complete search history.

(56) References Cited

U.S. PATENT DOCUMENTS

| | | | |
|---|---|---|---|
| 6,990,070 B1 * | 1/2006 | Aweya et al. | 370/230 |
| 2005/0136833 A1 * | 6/2005 | Emeott et al. | 455/11.1 |
| 2005/0152397 A1 * | 7/2005 | Bai et al. | 370/468 |
| 2007/0030864 A1 * | 2/2007 | Eastwood et al. | 370/503 |
| 2007/0121504 A1 * | 5/2007 | Hellenthal et al. | 370/230 |
| 2008/0109865 A1 * | 5/2008 | Su et al. | 725/116 |

OTHER PUBLICATIONS

Y. Jeong, S. Kakumanu, C.-L. Tsao, and R. Sivakumar, "Improving VoIP Call Capacity over IEEE 802.11 Networks," IEEE International Conference on Broadband Communications, Networks, and Systems (BROADNETS), Raleigh, NC, USA, Sep. 2007.

* cited by examiner

*Primary Examiner* — Hassan Phillips
*Assistant Examiner* — Anez Ebrahim
(74) *Attorney, Agent, or Firm* — Thomas|Horstemeyer, LLP

(57) ABSTRACT

Devices, systems, and methods of improving protocol performance are disclosed. One method includes transmitting a block of frames to another communication device, and upon completion of the transmitting, requesting an acknowledgement of the transmitted block from the another communication device. The method further includes receiving the acknowledgement and adjusting the number of frames in the block based on information from the received acknowledgement.

12 Claims, 10 Drawing Sheets

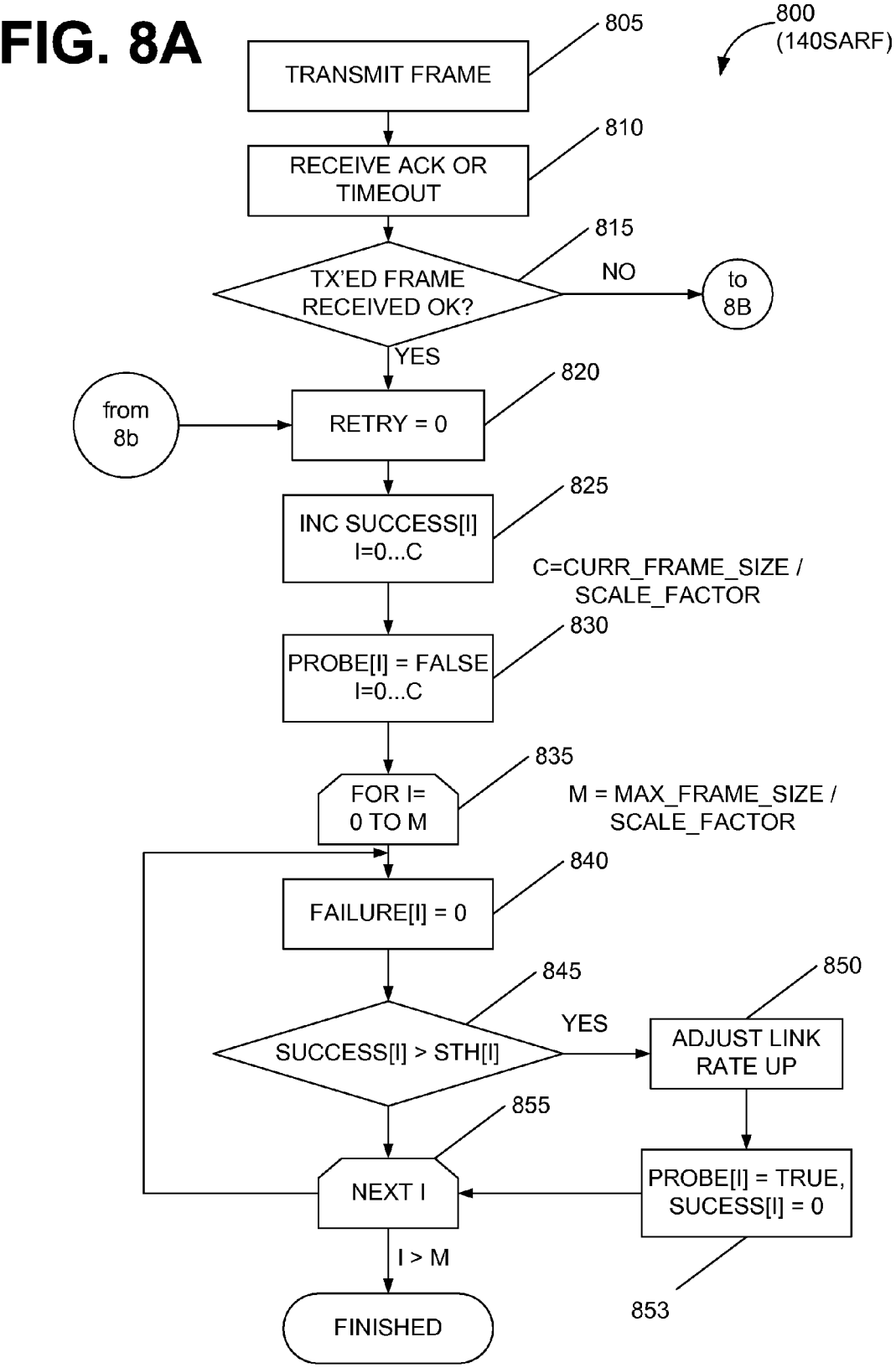

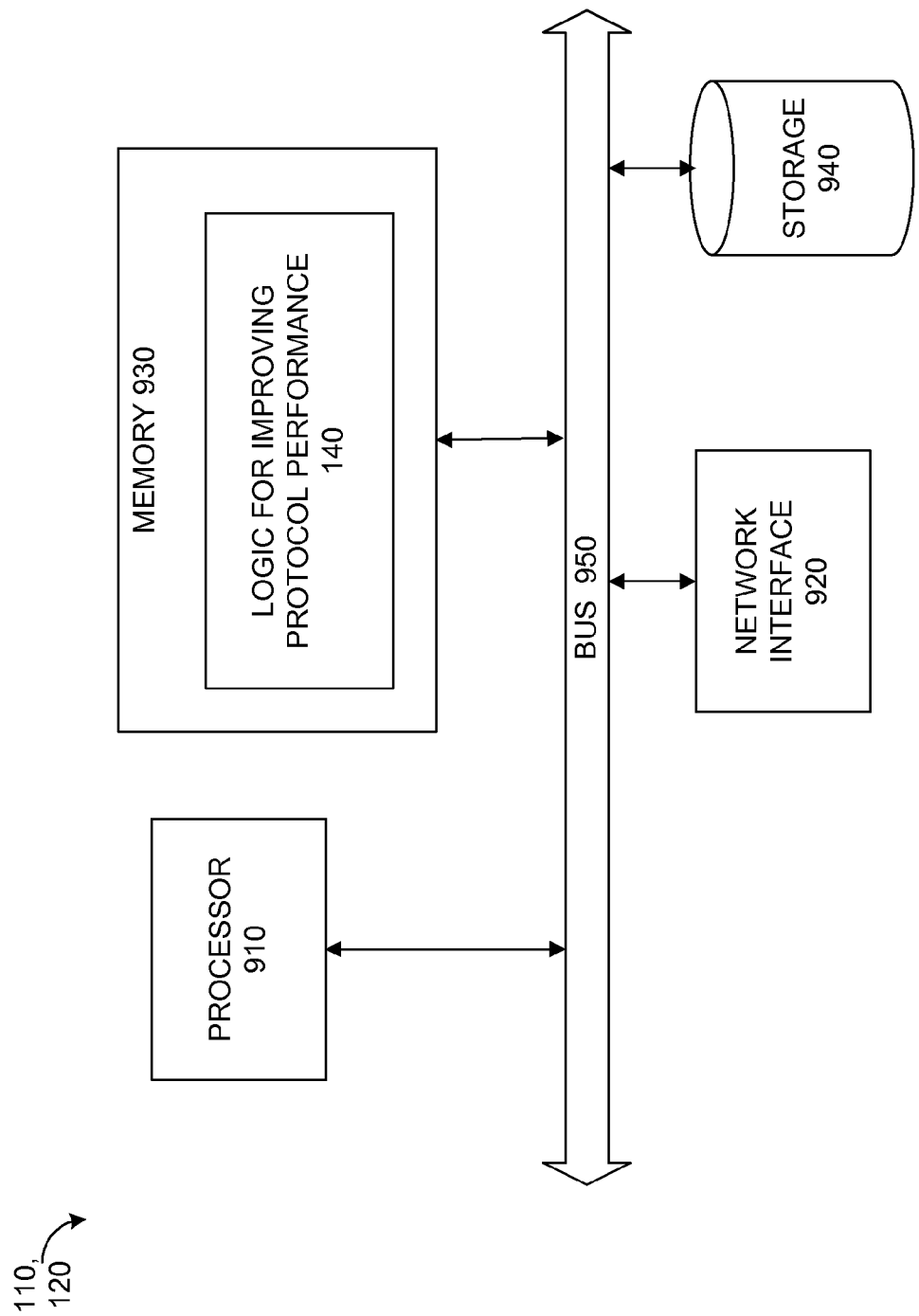

SYSTEMS AND METHODS OF IMPROVING PROTOCOL PERFORMANCE

CROSS REFERENCE TO RELATED APPLICATIONS

This application claims the benefit of U.S. Provisional Application 60/858,989, filed Nov. 14, 2006, which is hereby incorporated by reference herein.

STATEMENT REGARDING FEDERALLY SPONSORED RESEARCH OR DEVELOPMENT

This invention was made with Government support under Agreement No. CNS-0519733, awarded by the National Science Foundation. The Government has certain rights in this invention.

FIELD OF THE DISCLOSURE

The present disclosure relates to data communication, and more specifically, to data communication protocols.

BACKGROUND

The move from wired networks to wireless networks such as those implemented by IEEE 802.11 (also known as "WiFi") is becoming more and more common. At the same time, making telephone calls over the Internet, using a technology such as Voice over Internet Protocol (VoIP) is also growing in popularity. However, wireless networks that use conventional protocol suites often support an unexpectedly small number of calls, even when the bandwidth offered by the wireless network would suggest a larger number of calls.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIGS. 8A and 8B form a flowchart of an embodiment of logic for improving protocol performance, which implements size-aware automatic rate fallback.

FIG. 9 is a hardware block diagram of a transmitting device or receiving device from FIG. 1.

SUMMARY

Systems and methods of improving protocol performance are disclosed. One method includes transmitting a block of frames to another communication device, and upon completion of the transmitting, requesting an acknowledgement of the transmitted block from the another communication device. The method further includes receiving the acknowledgement and adjusting the number of frames in the block based on information from the received acknowledgement.

Another method includes aggregating a first number of a plurality of frames to produce an aggregated frame. The method further includes delaying transmission of the aggregated frame for a particular amount of time, responsive to a comparison of the first number with a second number of frames included in the last aggregated frame previously received from another communication device.

Another method includes determining whether a transmitted frame was successfully received at another communication device, and responsive to the determining, updating a plurality of counters based on the size of the transmitted frame. Each of the counters corresponds to one of a plurality of frame sizes. The method further includes adjusting a plurality of transmit link rates, each associated with a particular frame size. The adjustment is responsive to a comparison of at least one of the counters to a threshold associated with one of the plurality of frame sizes.

DETAILED DESCRIPTION

Figure 1:
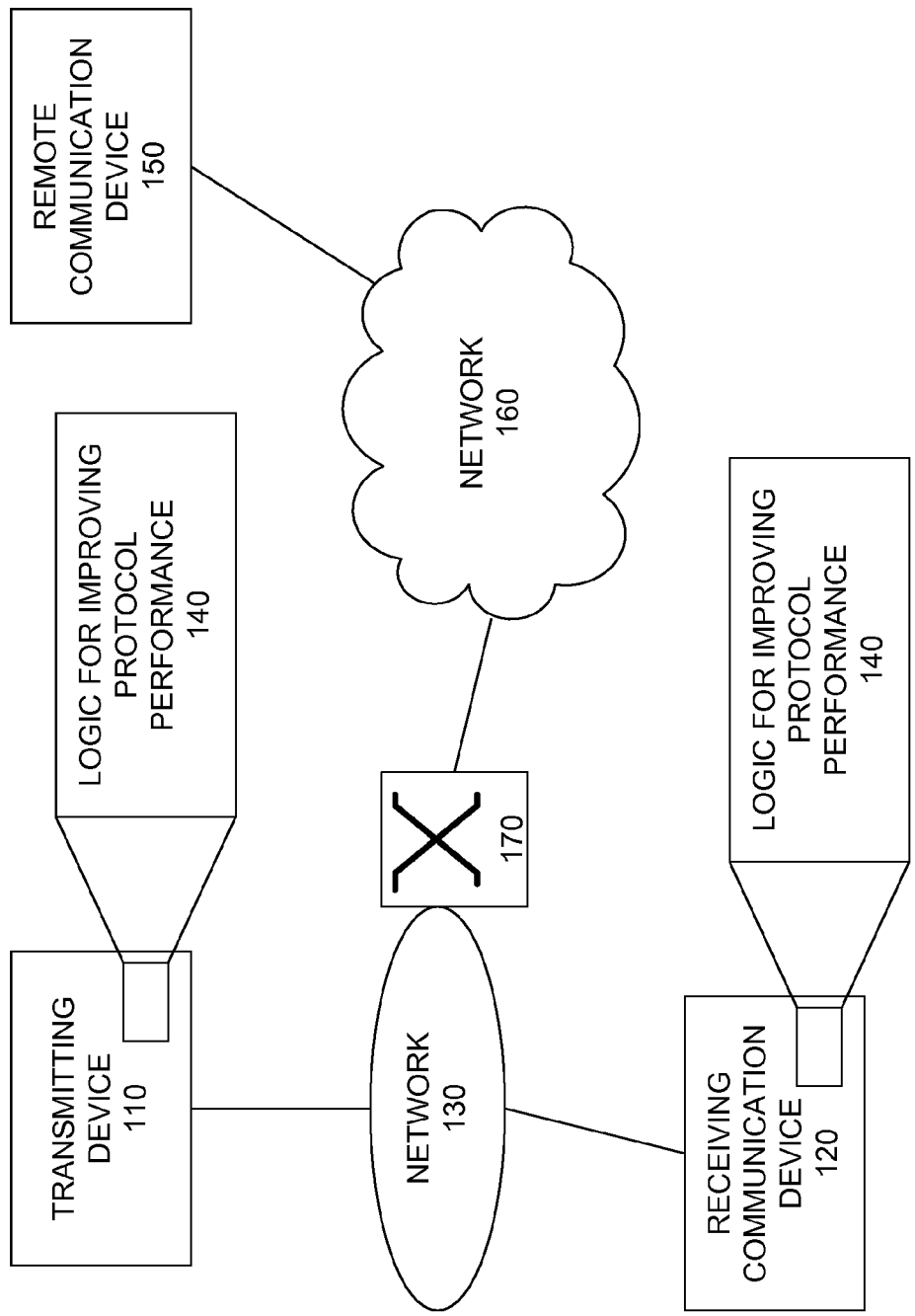
FIG. 1 is a block diagram of an environment in which one embodiment of a system and method for improving protocol performance is located.

FIG. 1 is a block diagram of an environment in which one embodiment of a system and method for improving protocol performance is located. A transmitting device 110 is in communication with a receiving device 120 over a network 130. Transmitting device 110 and receiving device 120 each include logic for improving protocol performance 140, which will be explained in further detail below in connection with FIGS. 3-8. Although FIG. 1 shows one device as a transmitter and one as a receiver, a person of ordinary skill in the art should appreciate that each device may in fact contain complementary functionality. That is, logic for improving protocol performance 140 in transmitting device 110 may also allow the device to function as receiving device 120.

In this example embodiment, transmitting device 110 or receiving device 120 is also in communication with a remote device 150 over another network 160. In some embodiments, network 160 is the Internet, and Voice over IP (VoIP) calls are carried between remote device 150 and transmitting device 110. A router 170 provides connectivity between network 160 and 130. Although the router is a logically separate entity, in some embodiments router 170 resides in the same system as transmitting device 110 or receiving device 120, reducing overhead between the two at the MAC layer.

In some embodiments, network 130 is a wireless local area network (LAN) implementing one of the IEEE 802.11 standards (commonly known as WiFi). In such embodiments, one of transmitting device 110 or receiving device 120 is an 802.11 access point, and the other is an 802.11 station.

Figure 2:
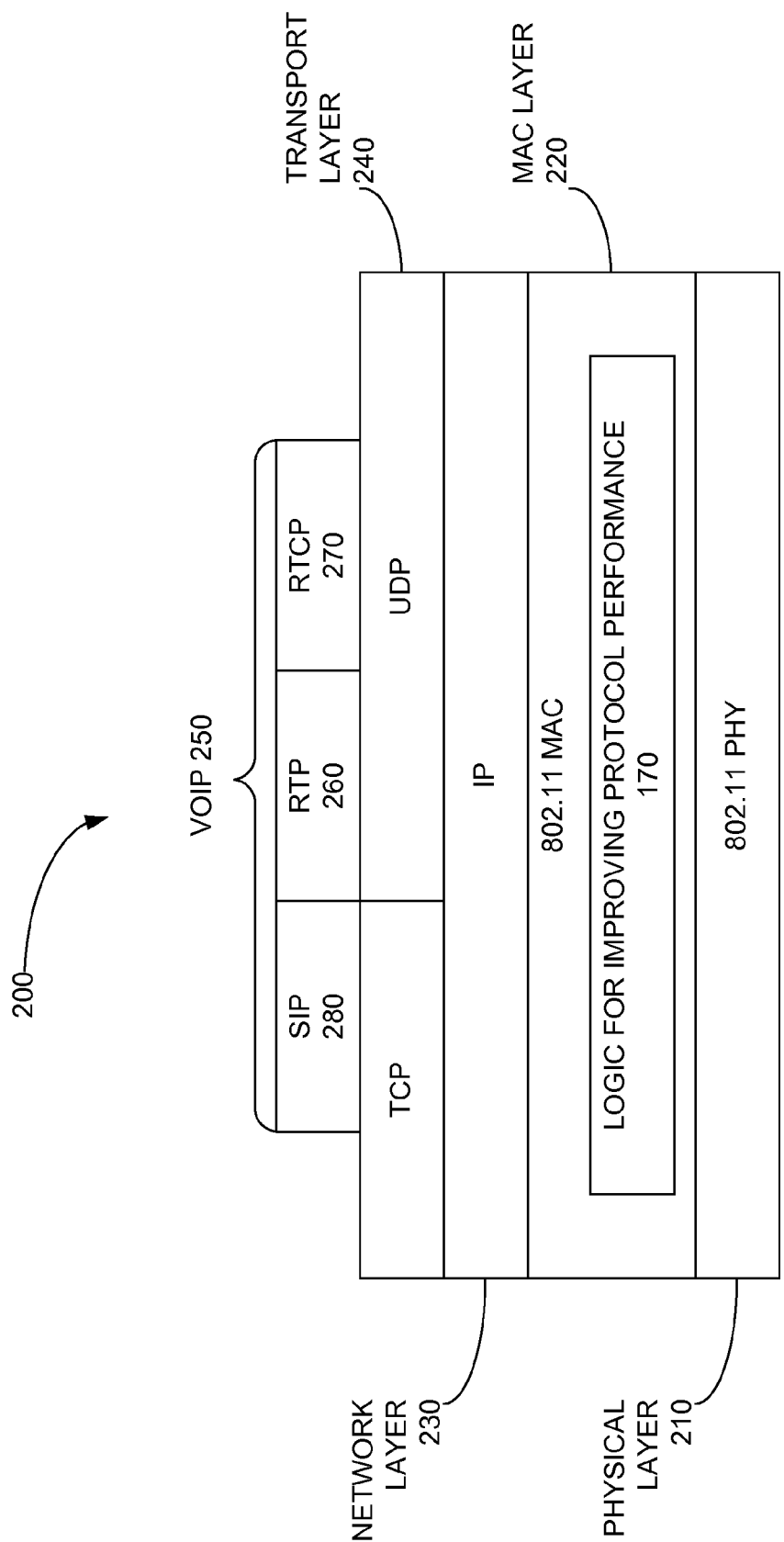
FIG. 2 is a block diagram of a protocol stack which includes logic for improving protocol performance from FIG. 1.

FIG. 2 is a block diagram of a protocol stack 200 which includes logic for improving protocol performance 140 and resides in example embodiments of transmitting device 110 and receiving device 120. Illustrated, from bottom to top, are a physical layer 210, a media access control (MAC) layer 220, a network layer 230 (e.g., Internet Protocol), and one or more transport layers 240 (e.g., Transport Control Protocol and User Datagram Protocol).

In this example, MAC layer 220 is implemented in accordance with IEEE 802.11, and a set of voice over IP (VoIP) protocols 250 run on top of transport layers 240: Real-time Transport Protocol (RTP) 260; Real-time Transport Control Protocol (RTCP) 270; and Session Initiation Protocol (SIP) 280. Logic for improving protocol performance 140 has particular advantages in an environment that combines VoIP and IEEE 802.11. However, the techniques implemented by logic 140 are also applicable to other environments. Furthermore, although logic 140 is implemented within MAC layer 220 in the example of FIG. 2, logic 140 can also be used at other layers, such as transport layer 240.

Various embodiments of logic for improving protocol performance 140 will now be described, including adaptive aggregation of acknowledgements, aggregation of multiple protocol data units into a single frame, and size-aware automatic rate fallback. These techniques can be used alone, or in various combinations.

Figure 3:
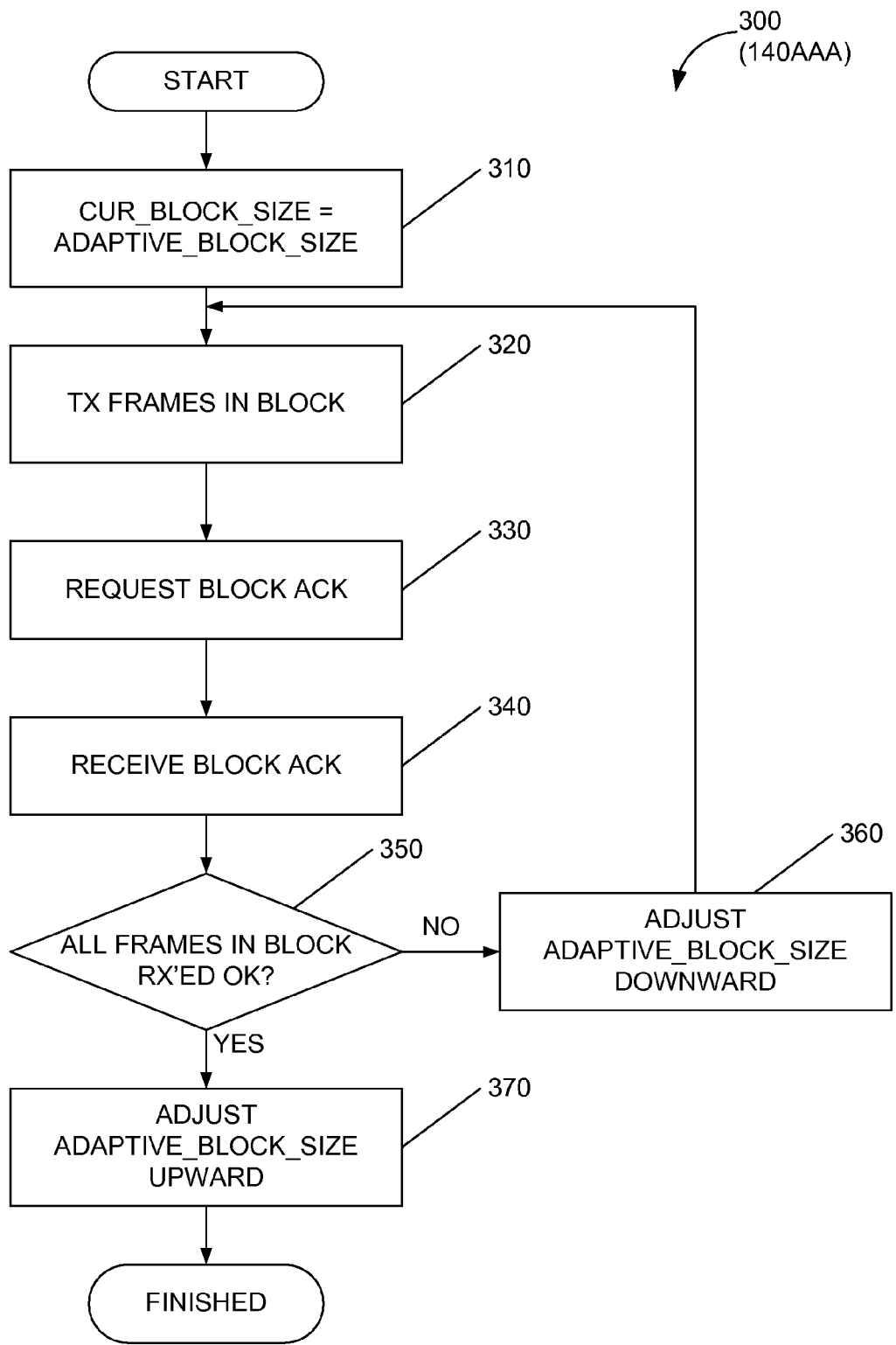
FIG. 3 is a flowchart of the transmitter portion of an embodiment of logic for improving protocol performance from FIG. 1, which implements an adaptive acknowledgement aggregation process.
Figure 4:
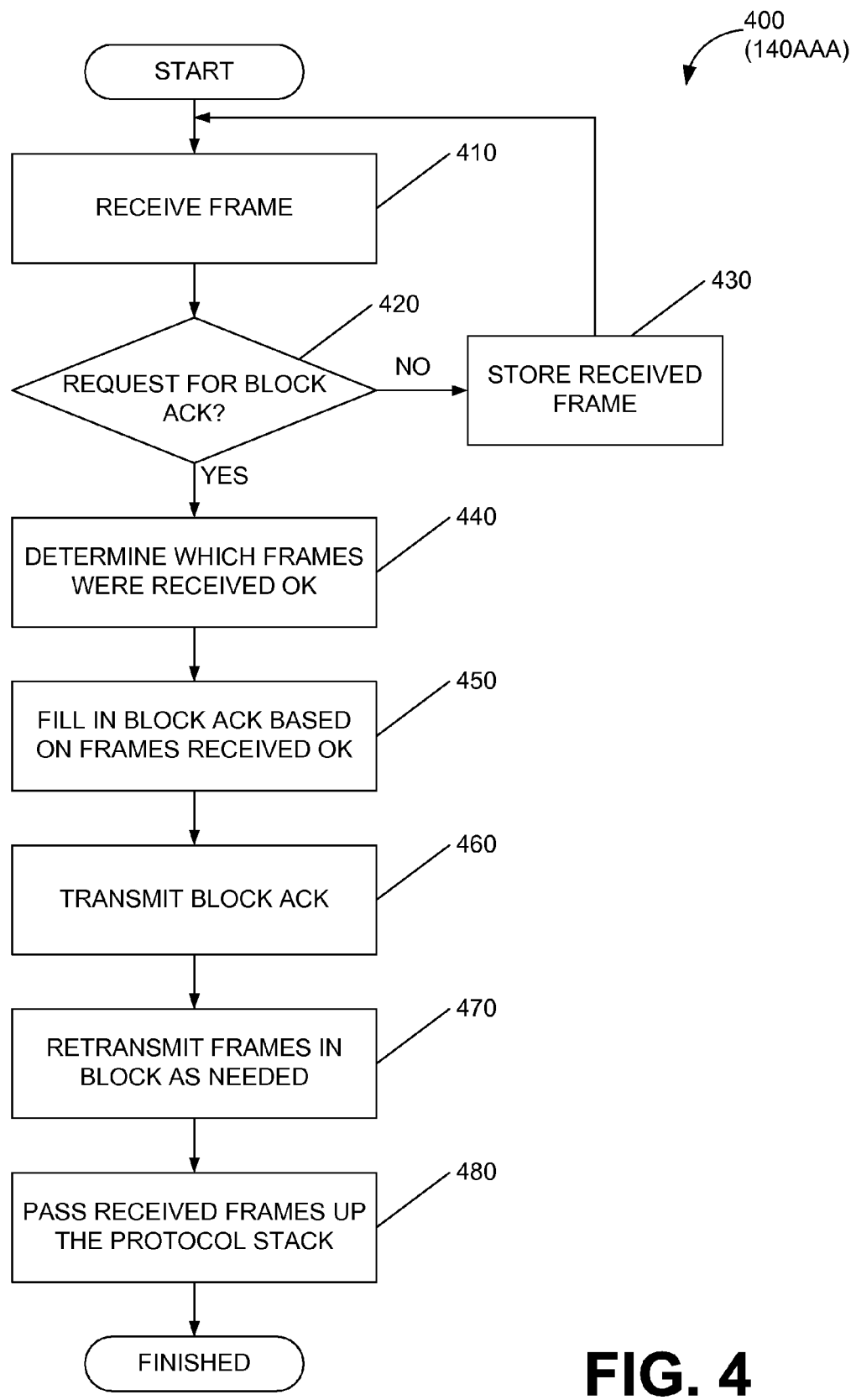
FIG. 4 is a flowchart of the receiver portion of an embodiment of logic for improving protocol performance from FIG. 1, which implements an adaptive acknowledgement aggregation process.

FIGS. 3 and 4 are flowcharts describing an example embodiment of logic for improving protocol performance 140AAA, which implements adaptive acknowledgement aggregation. FIG. 3 is a flowchart of the transmitter portion of logic 140AAA, while FIG. 4 is a corresponding flowchart of the receiver portion of logic 140AAA. Logic 140AAA is contained within transmitting device 110 and receiving device 120, which act as complementary stations. That is, a transmitter portion of one device communicates with a receiver portion of the other device.

Turning to FIG. 3, adaptive acknowledgment transmitter process 300 executes for each block of frames to be transmitted to one particular destination. Process 300 begins with an initialization step 310, where the current block size is initialized to the adaptive block size (set in the previous execution of block 360 or 370). At step 320, the frames in the block are transmitted, and processing then continues at step 330 where a request for a block acknowledgement is transmitted to the destination. In some embodiments, the block acknowledgement frame itself contains the block size (i.e., the number of frames in the block for which acknowledgement is requested).

The block acknowledgement is received at step 340, and step 350 examines the block acknowledgement to determined whether or not the destination successfully received all frames in the block that was transmitted at step 320. The number of frames in the block (i.e., the number of frames transmitted by the next execution of step 320) is then adjusted appropriately at step 360 or 370. If all frames in the last block were not successfully received by the destination, then the block size is decreased at step 360, and processing continues at block 320, so the frames in the block not successfully received are retransmitted. If all frames in the last block were successfully received by the destination, the block size is increased at step 370. At this point, all frames in the block have been successfully transmitted to the destination, and process 300 is finished.

A person of ordinary skill in the art should appreciate that the adjustment of block size in steps 360 and 370 can be performed using various techniques. For example the increase or decrease can be linear, or non-linear, and a maximum/minimum value can be used as a ceiling/floor. Furthermore, the increase and the decrease can use different techniques (e.g., linear increase and non-linear decrease).

Although process 300 handles frames sent by the transmitter to a particular receiver, the description of process 300 is not meant to imply that such frames are synchronously transmitted, or that process 300 waits while such frames are transmitted or retransmitted. Instead, a person of ordinary skill in the art should understand that the actual transmission of frames may occur using various techniques, including (among others) asynchronous events, interrupt handlers, or combinations of the two.

FIG. 4 is a flowchart of flowchart of the receiver portion of logic 140AAA, implementing the adaptive acknowledgement aggregation process. Process 400 handles a block of frames received from a particular transmitter, including request for retransmission. When all frames in a block have been successfully received, process 400 passes the frames up to the next layer.

Process 400 begins at step 410, which receives a frame. Step 420 examines the frame to determine whether the received frame is a request for a block acknowledgement. If No, then step 430 buffers the received frame, and continues to block 410 to await another frame. If Yes, then step 440 examines the buffer of received frames (stored at step 430) to determine which frames in the block were successfully received. Step 450 fills in a block acknowledgment frame based on this information, and step 460 sends the block acknowledgment frame to the corresponding transmitter.

In one example embodiment, the block acknowledgment frame is a bitmask, with a 1 in bit position X signifying "frame X of the block successfully received" and a 0 in bit position X signifying "frame X of the block not successfully received". A person of ordinary skill in the art should be familiar with other acknowledgment techniques that can be used in the block acknowledgment frame to convey information about the receipt of a particular frame in the block.

After sending the block acknowledgment frame at step 460, processing continues at step 470, where frames retransmitted by the transmitter (in response to the acknowledgement) are received. Having successfully received all frames in the block, step 480 passes the frames up to the next protocol layer, and process 400 is then finished. In another embodiment (not shown), individual frames in the block are passed up to the next protocol upon successful receipt (step 430), rather than using a step 480 that waits and passes up all frames in the block at once.

Although process 400 handles frames directed to the receiver by a particular transmitter, the description of process 400 is not meant to imply that such frames are synchronously received, or that process 400 waits to receive such frames. Instead, a person of ordinary skill in the art should understand that the actual reception of frames may occur using various techniques, including asynchronous events, interrupt handlers, or combinations of the two.

Figure 5:
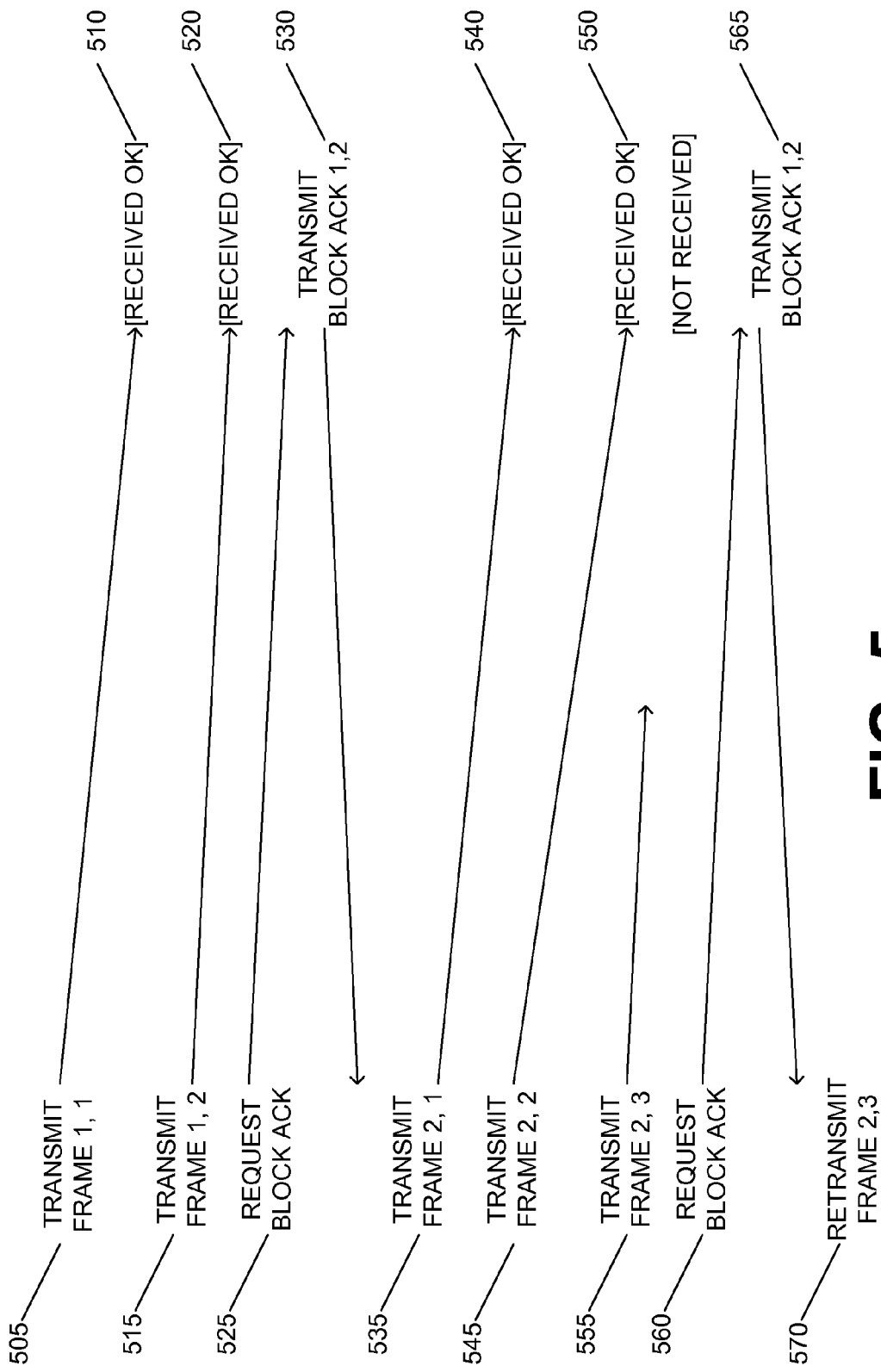
FIG. 5 is a messaging diagram illustrating interaction between the adaptive acknowledgement transmitter of FIG. 3 and the adaptive acknowledgement receiver of FIG. 4.

FIG. 5 is a messaging diagram illustrating interaction between an adaptive acknowledgement transmitter from FIG. 3 and a complementary adaptive acknowledgement receiver from FIG. 4. The sequence starts with adaptive acknowledgement transmitter sending (505) the first frame in the first block, where the block size is 2 frames. Adaptive acknowledgement receiver successfully receives (510) the first frame in the first block. Adaptive acknowledgement transmitter sends (515) the next frame in the first block. Adaptive acknowledgement receiver successfully receives (520) this next frame. Since the block size in this example is 2, the entire block has been transmitted, and adaptive acknowledgement transmitter then sends (525) a request for a block acknowledgment. Adaptive acknowledgement receiver responds by sending (530) a block acknowledgment frame which indicates that frames 1 and 2 have been successfully received. Although not shown in this diagram, adaptive acknowledgement transmitter increases the block size as a result of the indication that receiver has successfully received all frames in the block.

The sequence continues with adaptive acknowledgement transmitter sending (535) the first frame in the first block. Adaptive acknowledgement receiver successfully receives (540) the first frame in the second block. Adaptive acknowledgement transmitter sends (545) the next frame in the second block. Adaptive acknowledgement receiver successfully receives (550) this next frame. Adaptive acknowledgement transmitter sends the last block in the frame, but in this example the frame is lost (555) in transmission, and is not received by adaptive acknowledgement receiver.

Since the entire block has been transmitted (the block size having been adjusted to 3 frames as a result of the first block being successfully received), adaptive acknowledgement transmitter sends (560) a request for a block acknowledgment. Adaptive acknowledgement receiver responds by sending (565) a block acknowledgment frame which indicates that frames 1 and 2 have been successfully received, but that frame 3 was not successfully received. Adaptive acknowledgement transmitter responds by retransmitting (570) frame 3 of the second block, and by decreasing the block size (not shown) as a result of an indication (565) that some frames were not successfully received.

Figure 6:
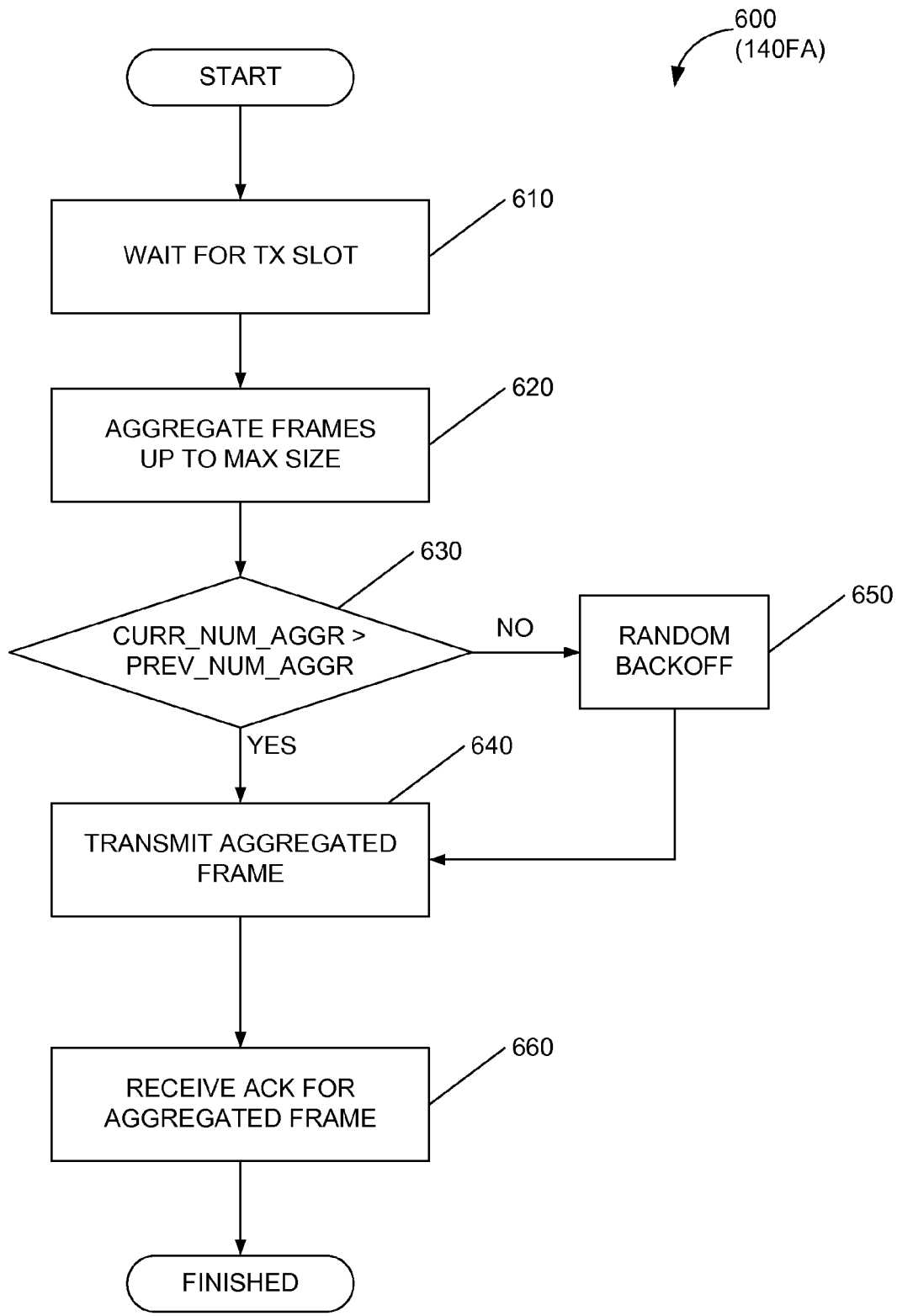
FIG. 6 is a flowchart of the transmitter portion of an embodiment of logic for improving protocol performance from FIG. 1, which implements a frame aggregation process.
Figure 7:
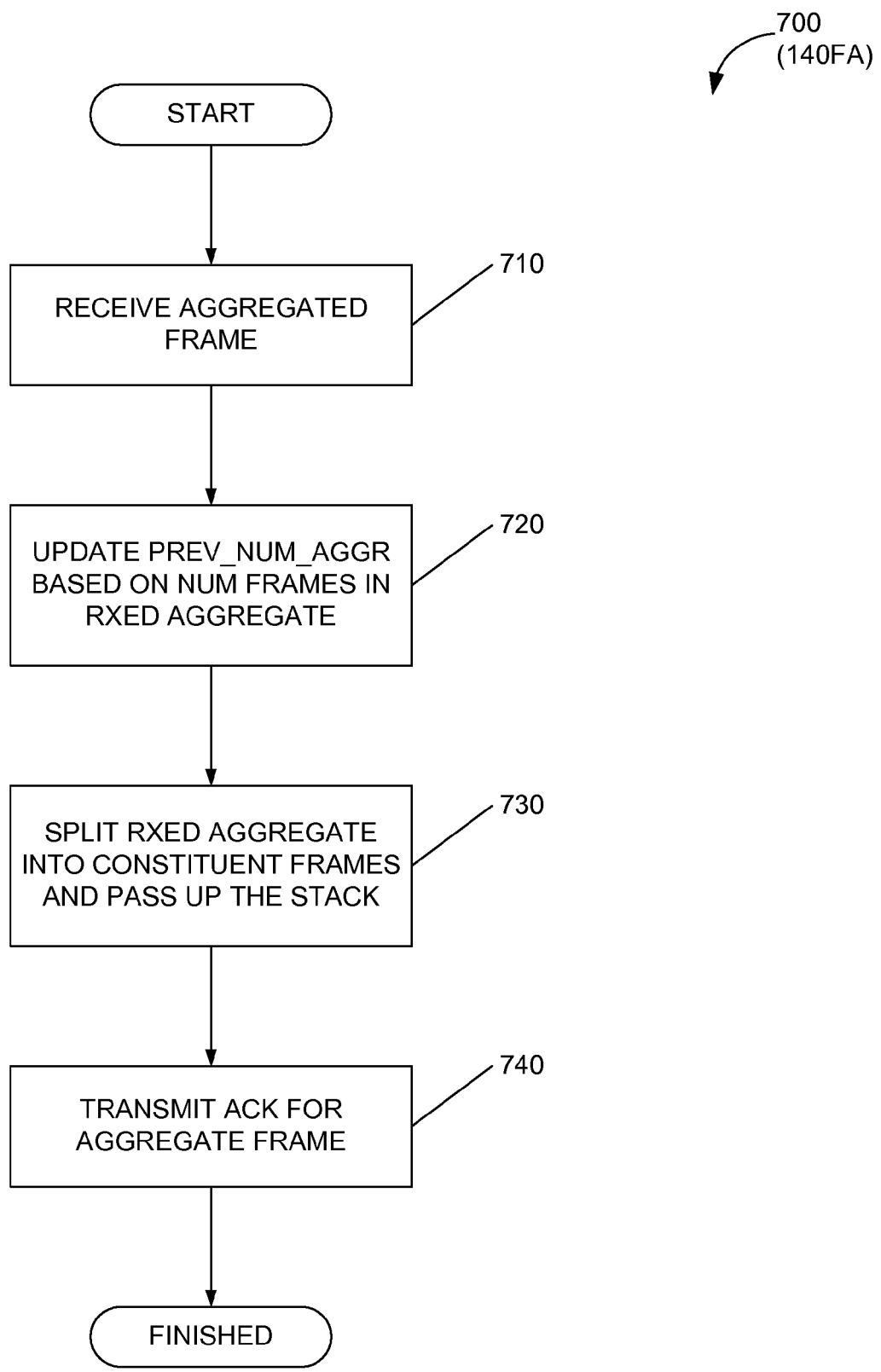
FIG. 7 is a flowchart of the receiver portion of an embodiment of logic for improving protocol performance from FIG. 1, implementing a frame aggregation process.

FIGS. 6 and 7 are flowcharts of an example embodiment of logic for improving protocol performance 140FA, which implements frame aggregation. FIG. 6 is a flowchart of the transmitter portion of logic 140FA, while FIG. 7 is a corresponding flowchart of the receiver portion of logic 140FA. Logic 140FA is contained within transmitting device 110 and receiving device 120, which act as complementary units. That is, a transmitter portion of one device communicates with a receiver portion of the other device.

Turning to FIG. 6, frame aggregation receiver process 600 operates to aggregate the data contents multiple frames into a single frame. In this embodiment, the aggregation behavior of the local transmitter depends on information maintained by the local receiver (in the same device). Specifically, if the number of frames aggregated by the local transmitter is not as large as the number of frames already received by the layer above the MAC layer, then the local transmitter waits to transmit.

Process 600 begins at step 610, which waits for a transmit slot (e.g., until the short interframe space, distributed interframe space, and/or backoff times in the MAC layer have passed). At step 620, the data portions of frames in the transmit queue are aggregated or combined into a single MAC layer frame, up to a maximum number of bytes. That is, the MAC headers of the individual frames are removed so that the aggregated frame contains one MAC header. In some embodiments, the maximum number of bytes in an aggregated frame corresponds to the largest frame allowed by the standard for the MAC layer.

In some embodiments, those frames chosen at step 620 for aggregation have the same MAC destination address. In other embodiments, the aggregated frame can include frames addressed to different MAC destinations. In such embodiments, receivers listen for aggregated frames regardless of whether the MAC destination address in the frame matches their own MAC address (e.g., promiscuous mode). On receipt of an aggregated frame, the receiver extracts those protocol data units (PDUs) carried within the aggregated frame which are addressed to that receiver. For example, if the network layer above the MAC layer is IP, then the receiver looks for IP datagrams having the receiver's IP destination address. Note that even though receivers are examining frames having other destination addresses, security is not comprised, since IP packets carried by the MAC frames can still be encrypted using a destination-based key. Therefore, a receiver having a particular destination address will be able to decode only those IP packets that are intended specifically for it.

At step 630, the number of PDUs aggregated (at step 620) is compared to the number of PDUs that were aggregated in the previous frame received from the complementary unit. This variable, PrevNumAggregated, is managed by the receiver aggregation process 700 in the same device (described in connection with FIG. 7). If the number of PDUs just aggregated is more than the number previously aggregated, the aggregated frame is transmitted at step 640. Otherwise, then a random backoff is performed at step 650, before transmitting at step 640. In some embodiments (e.g., those with a fixed delay budget) the random backoff occurs without increasing the contention window. At step 660, the transmitter waits to receive an acknowledgement for the aggregated frame from the complementary unit. Process 600 is then finished.

FIG. 7 is a flowchart of the receiver portion of the logic 140FA, implementing the frame aggregation process. As will be described below, receiver frame aggregation process 700 in a particular device 100 interacts with transmitter frame aggregation process 600 in the same device (110, 120).

Process 700 begins at step 710, which receives an aggregated frame. Step 720 determines the number of PDUs contained the aggregated frame and updates PrevNumAggregated accordingly. (PrevNumAggregated is a variable used by transmitter frame aggregation process 600 in the same device 100.) Processing continues at step 730, which splits the aggregated frame into its constituent PDUs and passes these PDUs up to the layer above. At step 740, an acknowledgement is sent for the aggregated frame, and process 700 is complete.

As described above, transmitter frame aggregation process 600 and receiver frame aggregation process 700 reside in a MAC client rather than a MAC access point. In another embodiment (not shown), frame aggregation processes 600 and 700 check a "role" variable which indicates execution in a MAC client or a MAC access point, and execute steps involving the PrevNumAggregated variable (e.g. steps 630 and 720) only if the role variable indicates execution in a MAC client.

Figure 8B:
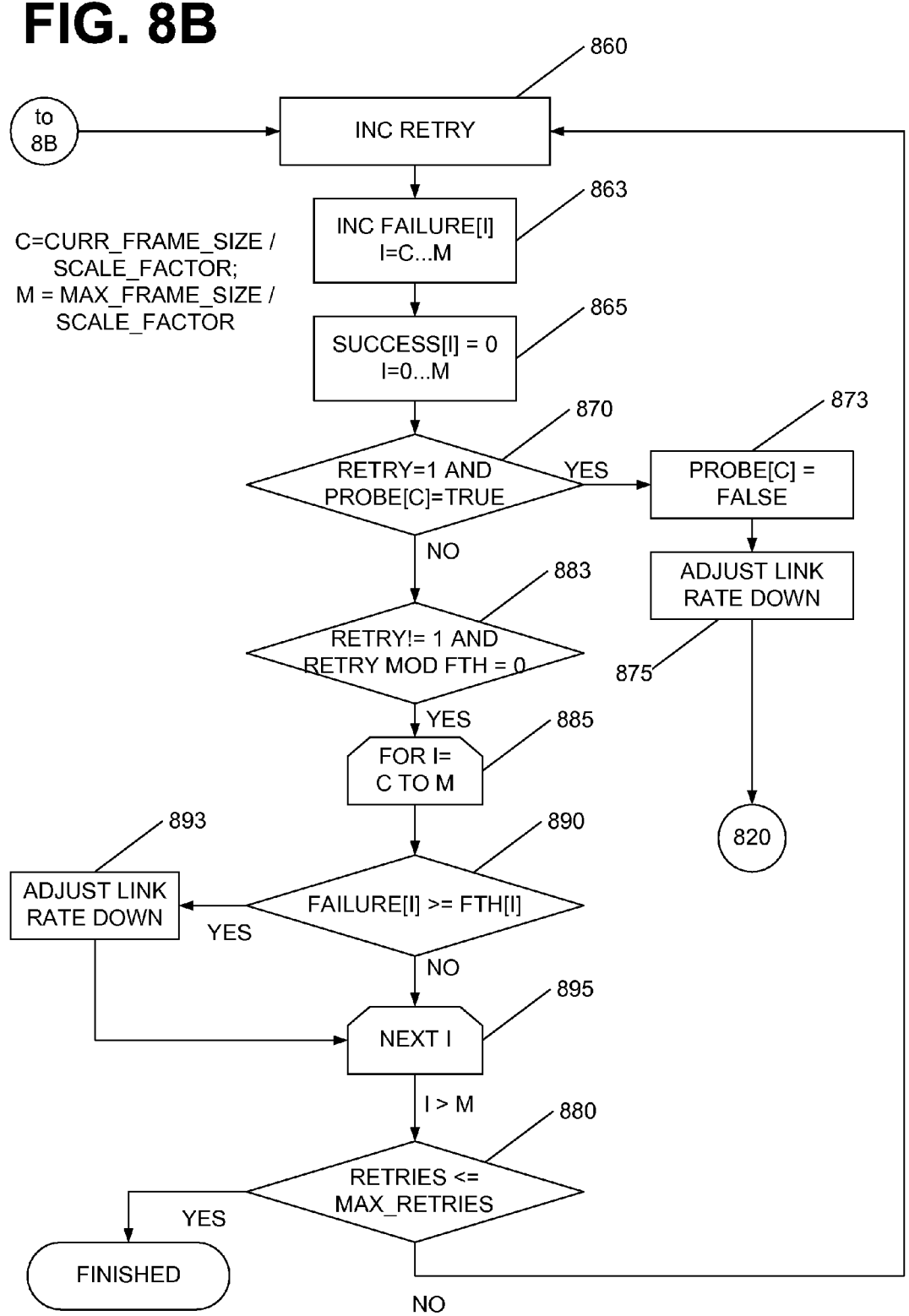

FIGS. 8A and 8B form a flowchart of an example embodiment of logic for improving protocol performance 140SARF, which implements size-aware automatic rate fallback. Logic 140SARF is contained within transmitting device 110. Size-aware automatic rate fallback process 800 maintains two sets of counters: a set of success counters, one for each frame size; and a set of failure counters, one for each frame size. The success counters are updated upon reception of an acknowledgement for a frame, and the failure counters are updated after no acknowledgement is received (e.g., a timeout). Specifically, upon an acknowledgment of a frame of size C, success counters for frame sizes below C are incremented. Similarly, upon an acknowledgment timeout for a frame of size C, failure counters for frame sizes above C are incremented. When an individual counter reaches a predetermined threshold value, the rate for the corresponding frame size is updated.

The example embodiment described below also handles the scenario when link rate for a certain frame size has recently been increased, followed by an immediate failure at the increased link rate, by decreasing link rate upon the immediate failure rather than waiting for the failure threshold. This is accomplished as follows. When the link rate is increased, a probe variable is set to True. When a failure is detected and the probe variable is still True, the link rate is decreased immediately, irrespective of the number of failures as compared to the failure threshold. Then, on the first success at that link rate, the probe value is reset to False.

Referring now to FIG. 8, process 800 begins with step 805, where a frame is transmitted. At step 810, an acknowledgement for the frame is received or an acknowledgement timeout occurs. Step 815 examines the acknowledgment or timeout, and determines whether the frame just transmitted (at step 805) was successfully received. If Yes, processing continues at step 820. If No, processing continues at step 860 (FIG. 8B).

Upon a successfully received frame, step 820 initializes a retry counter to zero. Next, success counters are set to true and failure counters to false in steps 825-850. Step 825 upwardly adjusts a corresponding success counter for each frame size below the size of the received frame, where the size of the received frame is adjusted by a scale factor. In some embodiments, step 825 adjusts the success counter by incrementing by one, but other increments can be used. In some embodiments, step 825 uses a constant scale factor, which can include one so that no scaling is in fact performed. In other embodiments, the scale factor is variable, for example, based on frame size, link rate, error rate, etc.

Step 830 sets to False a corresponding Probe boolean for each frame size below the size of the received frame, adjusted by a scale factor. Use of the probe variable will be explained in more detail in connection with FIG. 8B.

Step 835 begins a loop iteration from a frame size of zero to the maximum frame size adjusted by a scale factor. Within the loop, step 840 downwardly adjusts the failure counter corresponding to the currently iterated frame size. In some embodiments, step 840 sets the failure counter to zero, but other downward adjustments can be used.

Step 845 compares a predetermined threshold associated with the currently iterated frame size to the success counter corresponding to the same frame size. If the success counter is over the threshold, then step 850 adjusts the link rate upward.

At step 853, the success counter is reset to zero and the probe set to True. Step 855 continues the iteration, moving to the next frame size and repeating steps 840, 845, and 850. When the last frame size (maximum frame size adjusted by a scale factor) has been processed, processing of the frame successfully received at step 805 is complete, and process 800 is finished.

Turning now to the remainder of the flowchart in FIG. 8B, step 860 is executed when step 815 (FIG. 8A) determines that an acknowledgement for the last transmitted frame was not received. Step 860 increments a retry counter, and then success and failure counters are adjusted as follows. Step 863 upwardly adjusts a corresponding failure counter for each frame size between the size of the received frame and the maximum frame size, where both sizes are scaled. (Note that the scale factor could be one). Step 865 downwardly adjusts each success counter below the maximum frame size, where the frame size adjusted by a scale factor (which could be one). In some embodiments, step 863 increments the failure counter by one and step 865 sets the success counter to zero, but other adjustments can be used.

Processing continues at step 870, which examines how many retries have occurred as well as the probe corresponding to the size of the received frame adjusted by a scale factor. If this pass is the first retry, and the probe is True, then the link rate for the size of the received frame adjusted by a scale factor, is adjusted downward at step 873. At step 875, the probe is reset to False.

Having processed one retry cycle for an unacknowledged frame, at step 880 the number of retry cycles is compared to a maximum number of retries. If the maximum has been reached, process 800 is finished. Otherwise, processing of the next retry then continues starting at block 820.

If the test at step 870 fails—this pass is not the first retry, or the probe is False—then step 883 determines whether the current retry number is not one and is a multiple of a predetermined failure threshold. (Testing for a multiple checks the number of retries in the current cycle, rather than from the start of the process.) If the current retry number meets these conditions, step 885 begins an iteration loop, starting at the size of the received frame, up to the maximum frame size, where both sizes are adjusted by a scale factor. Within this loop, step 890 compares the failure counter corresponding to the currently iterated frame size to a predetermined failure threshold. If the counter is above the threshold, step 893 adjusts the link rate for the currently iterated frame size downward. At step 895, the iteration continues with the next frame size, and processing for the next frame size starts again at step 890.

When the iteration is complete, one retry cycle for an unacknowledged frame has been processed. Processing continues at step 880, the number of retry cycles is compared to a maximum number of retries. If the maximum has been reached, process 800 is complete. Otherwise, processing of the next retry then continues starting at block 820 (FIG. 8A).

A person of ordinary skill in the art should realize that a number of different techniques can be used to determine the amount of rate adjustment that occurs in process 800 (e.g., steps 850, 893, 873). In one embodiment, a set of predetermined rates is used, and the adjustment selects the next highest rate in the set. In another embodiment, the rate is adjusted by a fixed amount. In yet another embodiment, the rate is adjusted proportionally.

FIG. 9 is a hardware block diagram of transmitting device 110 or receiving device 120 in accordance with one embodiment of the system and method for improving protocol performance disclosed herein. Devices 110,120 contain a number of components that are well known in the art of data communications, including a processor 910, a network interface 920, memory 930, and persistent storage 940. These components are coupled via bus 950. Examples of storage 940 include, for example, a hard disk, flash RAM, flash ROM, EEPROM, etc. A person of ordinary skill in the art should understand that network interface 920 may support different medias and speeds, etc. Memory 930 contains logic for improving protocol performance 140 from FIG. 1. Omitted from FIG. 9 are a number of conventional components, known to those skilled in the art, that are not necessary to explain the operation of network device 150.

The systems and methods disclosed herein can be implemented in software, hardware, or a combination thereof. In some embodiments, the device, system, and/or method is implemented in software that is stored in a memory and that is executed by a suitable microprocessor, network processor, or microcontroller situated in a computing device. In other embodiments, the device, system and/or method is implemented in hardware, including, but not limited to, a programmable logic device (PLD), programmable gate array (PGA), field programmable gate array (FPGA), an application-specific integrated circuit (ASIC), a system on chip (SoC), and a system in package (SiP).

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The flow charts, messaging diagrams, state diagrams, and/or data flow diagrams herein provide examples of the operation of logic for improving protocol performance 140, according to an embodiment of the present disclosure. Alternatively, these diagrams may be viewed as depicting actions of an example of a method implemented in logic for improving protocol performance 140. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The software components illustrated herein are abstractions chosen to illustrate how functionality is partitioned among components in some embodiments of a system and method for improving protocol performance. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead. As just one example, a particular implementation might use a linked list instead of an array.

Software components are described are described herein in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Software components referred to herein include executable code that is packaged, for example, as a standalone executable file, a library, a shared library, a loadable module, a driver, or an assembly, as well as interpreted code that is packaged, for example, as a class. In general, the components used by the systems and methods for anti-aliasing a procedural texture are described herein in terms of code and data, rather than with reference to a particular hardware device executing that code. Furthermore, the systems and methods can be implemented in any programming language, and executed on any hardware platform.

Process descriptions or blocks in flowcharts represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method performed by a communication device, the method comprising:
    transmitting to another communication device a first block containing a first number of link layer frames;
    upon completion of the transmitting, requesting block acknowledgement of the transmitted block from the another communication device; receiving the block acknowledgement; and
    adjusting a second number of link layer frames in a second block based on information from the received block acknowledgement; and
    transmitting the second block of frames, having the second number of link layer frames, to the another communication device;
    wherein the adjusting further comprises: decreasing the number of link layer frames in the second block responsive to an indication in the received block acknowledgement that at least one link layer frame in the first block was not received successfully.

2. The method of claim 1, wherein the request for the block acknowledgement includes the number of link layer frames in the transmitted first block.

3. The method of claim 1, wherein the adjusting further comprises:
    adjusting the second number of link layer frames in the second block based on an indication in the received block acknowledgement of how many link layer frames in the first block were successfully received by the another communication device.

4. The method of claim 1, wherein the adjusting further comprises:
    increasing the number of link layer frames in the block responsive to an indication from the received block acknowledgement that all link layer frames in the first block were received successfully by the another communication device.

5. The method of claim 1, wherein each of the plurality of link layer frames carries coded voice data.

6. A method performed by a communication device, the method comprising:
- determining whether a transmitted link layer frame was successfully received at another communication device;
- responsive to the determining, updating a plurality of counters based on the size of the transmitted link layer frame, each of the counters corresponding to one of a plurality of frame sizes; and
- responsive to a comparison of at least one of the counters to a threshold associated with one of the plurality of frame sizes, adjusting a plurality of transmit link rates, each associated with a particular frame size;
- wherein the plurality of counters comprises a first plurality of counters, the method further comprising: responsive to determining that the transmitted link layer frame was successfully received, updating a portion of the first plurality of counters corresponding to frame sizes less than the size of the transmitted link layer frame;

comparing each of the first plurality of counters to a threshold associated with the frame size that is associated with the corresponding counter; and responsive to one of the first plurality of counters exceeding the threshold; increasing the transmit link rate associated with the frame size that is associated with the corresponding counter.

7. The method of claim 6, wherein the plurality of counters comprises a first plurality of counters, the method further comprising:
- responsive to determining that the transmitted link layer frame was successfully received, updating a portion of the first plurality of counters corresponding to frame sizes less than the size of the transmitted link layer frame; and
- responsive to a comparison of each of the first plurality of counters to a threshold associated with the frame size that is associated with the corresponding counter, increasing the transmit link rate associated with the frame size that is associated with the corresponding counter.

8. The method of claim 6, wherein the plurality of counters comprises a first plurality of counters, the method further comprising:
- responsive to determining that the transmitted link layer frame was successfully received, updating a portion of the second plurality of counters corresponding to frame sizes up to a maximum frame size.

9. The method of claim 6, wherein the plurality of counters comprises a first and a second plurality of counters, the method further comprising:
- responsive to determining that the transmitted link layer frame was not successfully received, updating a portion of the second plurality of counters corresponding to frame sizes between the size of the transmitted frame and a maximum frame size; and
- responsive to a comparison of each counter in the updated portion to a threshold associated with the frame size that is associated with the corresponding counter, decreasing the transmit link rate associated with the frame size that is associated with the corresponding counter.

10. The method of claim 6, wherein the transmitted frame carries coded voice data.

11. A method performed by a communication device, the method comprising:
- determining whether a transmitted link layer frame was successfully received at another communication device;
- responsive to the determining, updating a plurality of counters based on the size of the transmitted link layer frame, each of the counters corresponding to one of a plurality of frame sizes; and
- responsive to a comparison of at least one of the counters to a threshold associated with one of the plurality of frame sizes, adjusting a plurality of transmit link rates, each associated with a particular frame size;
- responsive to determining that the transmitted link layer frame was successfully received, updating a first portion of the counters corresponding to frame sizes less than the maximum size;

responsive to determining that the transmitted link layer frame was not successfully received, updating a second portion of the counters corresponding to frame sizes between the size of the transmitted frame and a maximum frame size;

comparing each counter in the updated second portion to a threshold, the threshold associated with the frame size that is associated with the corresponding counter; and responsive to the comparison, adjusting the transmit link rate associated with the frame size that is associated with the corresponding counter.

12. A method performed by a communication device, the method comprising:
- determining whether a transmitted link layer frame was successfully received at another communication device;
- responsive to the determining, updating a plurality of counters based on the size of the transmitted link layer frame, each of the counters corresponding to one of a plurality of frame sizes; and
- responsive to a comparison of at least one of the counters to a threshold associated with one of the plurality of frame sizes, adjusting a plurality of transmit link rates, each associated with a particular frame size;
- wherein the plurality of counters comprises a first and a second plurality of counters, the method further comprising: responsive to determining that the transmitted link layer frame was successfully received, updating a first portion of the first plurality of counters corresponding to frame sizes less than the size of the transmitted link layer frame and updating a first portion of the second plurality of counters corresponding to frame sizes less than a maximum frame size; responsive to determining that the transmitted link layer frame was not successfully received, updating a second portion of the first plurality of counters corresponding to frame sizes less than the maximum frame size and updating a second portion of the second plurality of counters corresponding to frame sizes between the size of the transmitted frame and the maximum frame size;

comparing each counter in the first plurality to a threshold, the threshold associated with the frame size that is associated with the corresponding counter;

responsive to the comparison of counters in the first plurality, increasing the transmit link rate associated with the frame size that is associated with the corresponding counter; comparing each counter in the second portion of the second plurality to a threshold, the threshold associated with the frame size that is associated with the corresponding counter; and responsive to the comparison of counters in the second plurality, decreasing the transmit link rate associated with the frame size that is associated with the corresponding counter.

* * * * *